(12) United States Patent
Sylvain

(10) Patent No.: US 8,320,349 B1
(45) Date of Patent: *Nov. 27, 2012

(54) COMBINED USER AGENT FOR PACKET-BASED COMMUNICATION CLIENTS

(75) Inventor: Dany Sylvain, Gatineau (CA)

(73) Assignee: Rockstar Consortium US LP, Richardson, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/327,829

(22) Filed: Dec. 16, 2011

Related U.S. Application Data

(63) Continuation of application No. 10/885,279, filed on Jul. 6, 2004, now Pat. No. 8,116,286.

(51) Int. Cl.
*H04W 4/00* (2009.01)
*H04M 3/00* (2006.01)

(52) U.S. Cl. .................. 370/338; 455/420; 709/208

(58) Field of Classification Search .................. 370/328, 370/338; 455/418–420; 709/208, 217, 219
See application file for complete search history.

(56) References Cited

U.S. PATENT DOCUMENTS

| | | | |
|---|---|---|---|
| 7,046,134 | B2 | 5/2006 | Hansen |
| 2002/0136167 | A1 | 9/2002 | Steele et al. |
| 2003/0217122 | A1 | 11/2003 | Roese et al. |
| 2004/0172588 | A1 | 9/2004 | Mattaway |
| 2004/0181577 | A1 | 9/2004 | Skurikhin et al. |
| 2004/0236863 | A1 | 11/2004 | Shen et al. |
| 2004/0239754 | A1 | 12/2004 | Shachar et al. |
| 2004/0249884 | A1 | 12/2004 | Caspi et al. |
| 2006/0002388 | A1 | 1/2006 | Grebus et al. |

FOREIGN PATENT DOCUMENTS

WO  0052593 A1  9/2000

OTHER PUBLICATIONS

Notice of Allowance for U.S. Appl. No. 10/885,279 mailed Oct. 7, 2011, 15 pages.
Non-final Office Action for U.S. Appl. No. 10/885,279 Jun. 2, 2011, 19 pages.
Board of Patent and Interferences Decision on Appeal for U.S. Appl. No. 10/885,279 mailed Feb. 23, 2011, 16 pages.
Examiner's Answer to Appeal Brief for U.S. Appl. No. 10/885,279 mailed Aug. 18, 2008, 24 pages.
Advisory Action for U.S. Appl. No. 10/885,279 mailed Mar. 18, 2008, 7 pages.
Final Office Action mailed for U.S. Appl. No. 10/885,279 mailed Jan. 24, 2008, 13 pages.
Non-final Office Action for U.S. Appl. No. 10/885,279 Aug. 8, 2007, 13 pages.
Non-final Office Action for U.S. Appl. No. 10/885,279 Mar. 7, 2007, 12 pages.

(Continued)

*Primary Examiner* — Ajit Patel
(74) *Attorney, Agent, or Firm* — Withrow & Terranova, PLLC

(57) ABSTRACT

The present invention provides a combined user agent, which acts on behalf of multiple packet-based communication clients that may have different media capabilities. The combined user agent allows the different communication clients to cooperate with one another and participate in the same multimedia session. Different ones of the communication clients may support different types of media sessions. The combined user agent may present a single interface, which is associated with a single identification, on behalf of the supported communication clients to remote communication clients. As such, the combined user agent may appear to remote communication clients as a single communication client having the combined capabilities of the supported communication clients.

40 Claims, 9 Drawing Sheets

OTHER PUBLICATIONS

International Search Report for PCT/IB2005/001912 mailed Dec. 7, 2005, 2 pages.

Rosenberg et al., "RFC 3261," Jun. 2002, 265 pages.

IEEE "Standard 802.11," Jun. 12, 2007, 1,232 pages.

Huawei Technologies Co, Ltd., "Remote End User Control: Solution Proposal for Inter UE Transfers—Keep Control Mode," Aug. 2008, 15 pages.

COMBINED USER AGENT FOR PACKET-BASED COMMUNICATION CLIENTS

CROSS-REFERENCE TO RELATED APPLICATION

The present application is a continuation of U.S. patent application Ser. No. 10/885,279, filed on Jul. 6, 2004, the disclosure of which is hereby incorporated by reference in its entirety.

FIELD OF THE INVENTION

The present invention relates to communications, and in particular to allowing multiple communication devices to cooperate with one another such that they can participate in the same communication session.

BACKGROUND OF THE INVENTION

With the proliferation of packet-based communications, various types of devices may communicate with each other over disparate types of communication networks. Since these communication devices range from personal computers to mobile telephones and personal digital assistants, different ones of these devices have different capabilities. With different capabilities, certain devices may support certain types of media sessions, while other devices are better at supporting other types of media sessions. For example, a personal computer may support a video session better than a mobile terminal, yet the mobile terminal may support a voice session better than the personal computer. For a video conference, which includes voice and video sessions, it is common for one device to be forced to support both sessions. As such, compromises are often made in the quality of one or the other media sessions.

In general, multimedia sessions such as those including a video session associated with a voice session are intended for a select user and terminated to a single selected communication device associated with the user. Thus, the different media sessions within the multimedia session cannot easily be delivered to different ones of the user's communication devices for a given multimedia session, in an effort to take advantage of the relative strengths of the various communication devices associated with the user. As such, there is a need for an effective technique to coordinate the communication devices associated with a user to allow different media sessions within a given multimedia session to be delivered to different ones of the user's communication devices. Such collaboration would afford a more flexible and richer set of multimedia communication services to the user.

SUMMARY OF THE INVENTION

The present invention provides a combined user agent, which acts on behalf of multiple packet-based communication clients that may have different media capabilities. The combined user agent allows the different communication clients to cooperate with one another and participate in the same multimedia session. Different ones of the communication clients may support different types of media sessions. The combined user agent may present a single interface, which is associated with a single identification, which is presented on behalf of the supported communication clients to remote communication clients. As such, the combined user agent may appear to remote communication clients as a single communication client having the combined capabilities of the supported communication clients.

The combined user agent will replicate signaling between the supported communication clients and the remote communication clients to initiate, support, and alter media sessions that are established between the remote communication clients and the supported communication clients. Media sessions for different types of media are routed to the most appropriate of the supported communication clients based on a variety of criteria. The routing criteria may include preferences established by a user associated with the supported communication clients, or may relate to the relative location of the supported communication clients or the relative proximity of the supported communication clients to one another. Any of the supported communication clients may initiate a multimedia session that involves the other supported communication clients. Further, a media bridge may be employed when a media session should be replicated to multiple ones of the supported communication clients. The replicated media sessions may have different parameters based on the requirements and capabilities of the respective supported communication clients.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

Figure 1:
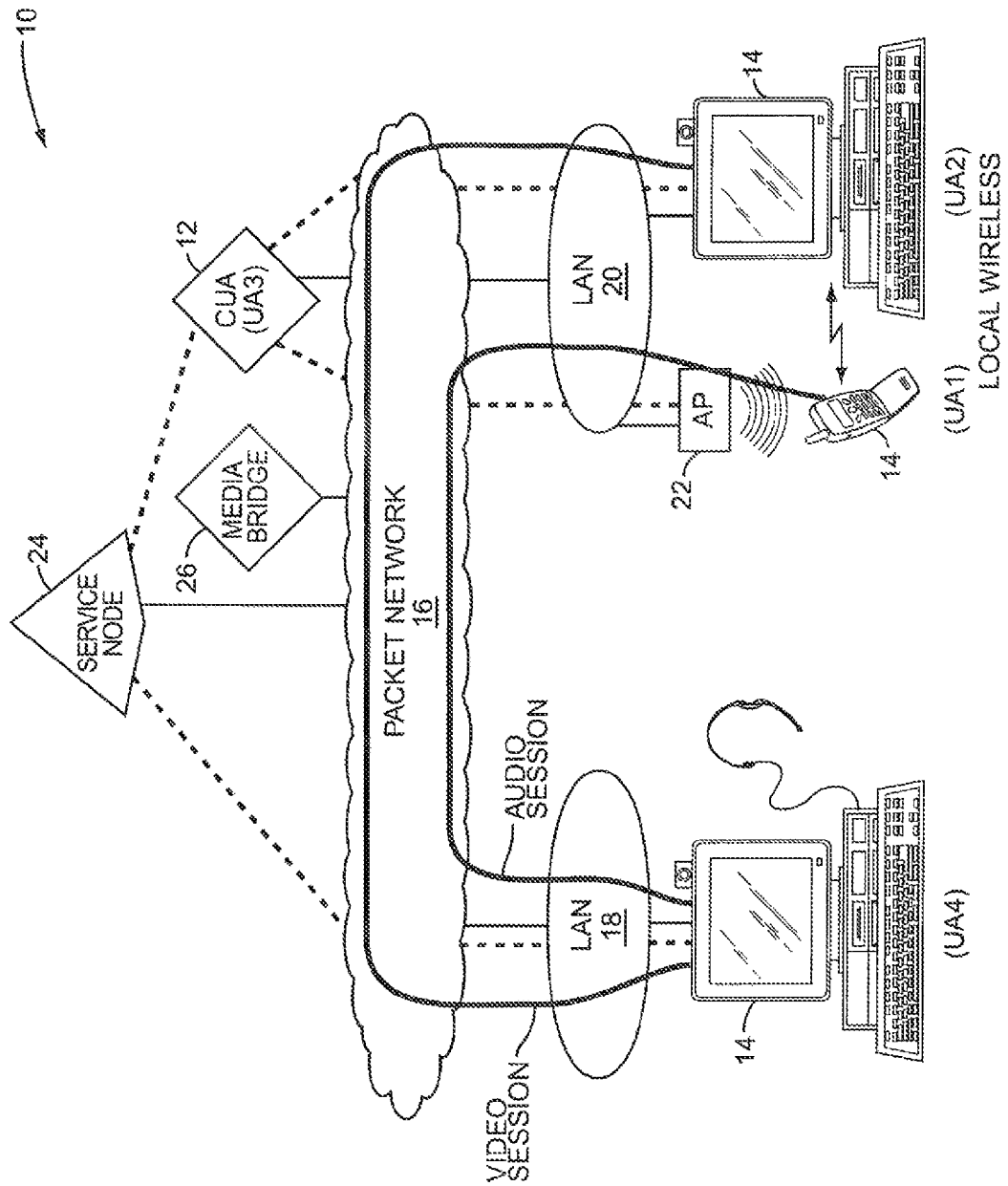
FIG. 1 is a block representation of a communication environment according to one embodiment of the present invention.

With reference to FIG. 1, a communication environment 10 is illustrated and includes a combined user agent (CUA) 12, which allows multiple communication clients 14 to cooperate and participate in the same communication session, as if the communication clients 14 were a single communication client. In essence, the combined user agent 12 presents a single communication interface for a number of communication clients 14 to other communication clients 14. Further, the combined user agent 12 will present a single communication ID, such as an address, on behalf of the supported communication clients 14 to other communication clients 14. As illustrated, the combined user agent 12 supports communication clients 14 associated with communication IDs UA1 and UA2. For other communication clients 14, such as the communication client 14 associated with communication address UA4, the combined user agent 12 provides a communication address UA3.

The combined user agent 12 represents combined communication clients 14 UA1 and UA2 as a single communication client having the combined capabilities of communication clients 14 UA1 and UA2. When a communication session is established with communication client 14 UA4, the combined user agent 12 will effectively interact with communication client 14 UA4 to establish media sessions between communication client 14 UA4 and the respective communication clients 14 UA1 and UA2. As illustrated, a video session is established with communication client 14 (UA2), and an audio session is established with communication client 14 (UA1).

The combined user agent 12 will directly or indirectly cooperate with the communication client 14 (UA4) to facilitate any session signaling necessary to establish the communication sessions between the respective communication clients 14. The combined user agent 12 will also interact with the supported communication clients 14 (UA1 and UA2) to replicate or provide the necessary call signaling to establish the desired communication sessions. Any of the communication clients 14 UA1 or UA2 supported by the combined user agent 12 may also initiate a session, wherein the combined user agent 12 will cooperate with the other supported communication clients 14 to establish the associated communication sessions with other communication client 14. Accordingly, the combined user agent 12 will distribute and replicate as necessary information related to the various communication sessions for the participating communication clients 14 supported by the combined user agent 12. Different media sessions will be routed to the most appropriate or desired communication client 14 supported by the combined user agent 12. Such routing may be based on user preferences, the relative location or proximity of the communication clients 14 with respect to each other, or any other criteria desired by the user or service provider.

In the illustrated example, the audio session may be established with the communication client 14 (UA1), which is a mobile terminal, when the mobile terminal is proximate to communication client 14 (UA2), which is a personal computer. Otherwise, the personal computer may be used to support the audio session, or another communication device, which is not illustrated may be used. The relative proximity of the respective devices may be detected in a variety of ways, which will be discussed in further detail below.

With continued reference to FIG. 1, the communication sessions are generally supported by a packet network 16 that is coupled to local area networks (LANs) 18 and 20, which support communication client 14 UA4 as well as communication clients 14 UA1 and UA2, respectively. Those skilled in the art will recognize various access technologies, including wired and wireless technologies, capable of providing such access. As illustrated, LAN 20 is associated with an access point 22, which is capable of providing wireless communications with the mobile terminal. In one embodiment, the access point 22 supports wireless local area networking (WLAN) communication techniques, such as those set forth in the IEEE 802.11 standard or Bluetooth standards. Communications may also be established through traditional cellular techniques, which support packet-based communications.

The session signaling between the various communication devices 14 may require a proxy function, which may be provided by a service node 24. The service node 24 may also provide general session signaling between the respective communication clients 14 as well as the combined user agent 12, as will be illustrated in greater detail below. A media bridge 26 may also be incorporated when the same media session, which is part of a multimedia session, must be terminated at multiple communication clients 14 that are being supported by the combined user agent 12. For example, if the video session can be provided to both communication client 14 UA1 and communication client 14 UA2, the video session may be established between the media bridge 26 and communication client 14 UA4, wherein the media bridge 26 will effectively establish separate video sessions with the respective communication clients 14 UA1 and UA2. The media bridge 26 may provide various protocol versions or adaptation to correspond to the different capabilities of the respective communication clients 14 UA1 and UA2.

In general, the combined user agent 12 acts as a single interface for the communication clients 14 that are being supported. The combined user agent 12 will also include a single address to which other communication clients 14, such as communication client 14 UA4, will use during session signaling and when initiating multimedia sessions. Although shown as a separate entity, the combined user agent 12 may in fact be integrated as part of the service node 24.

Figure 2A:
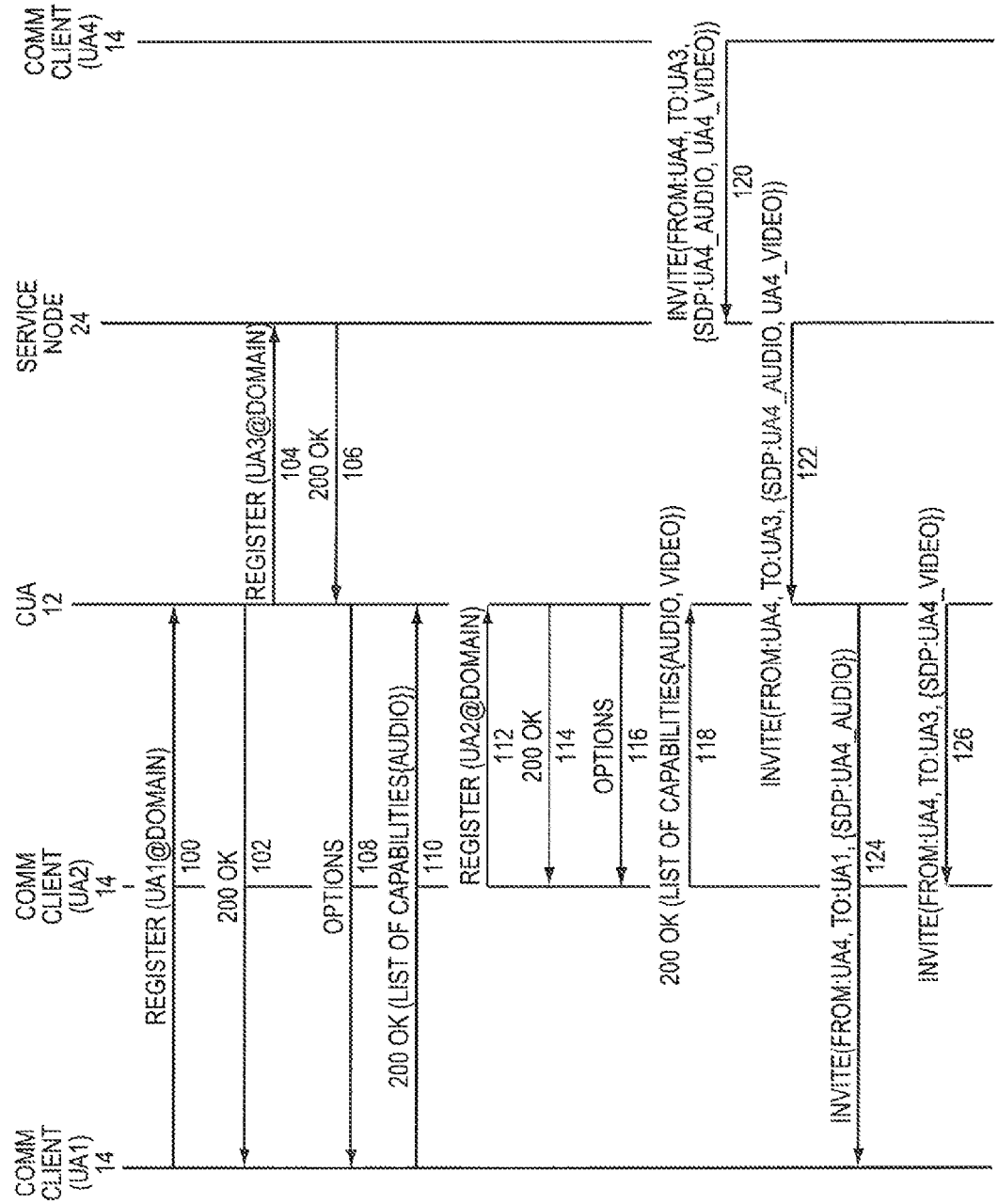
FIGS. 2A-2C show a communication flow diagram according to one exemplary embodiment of the present invention.
Figure 2B:
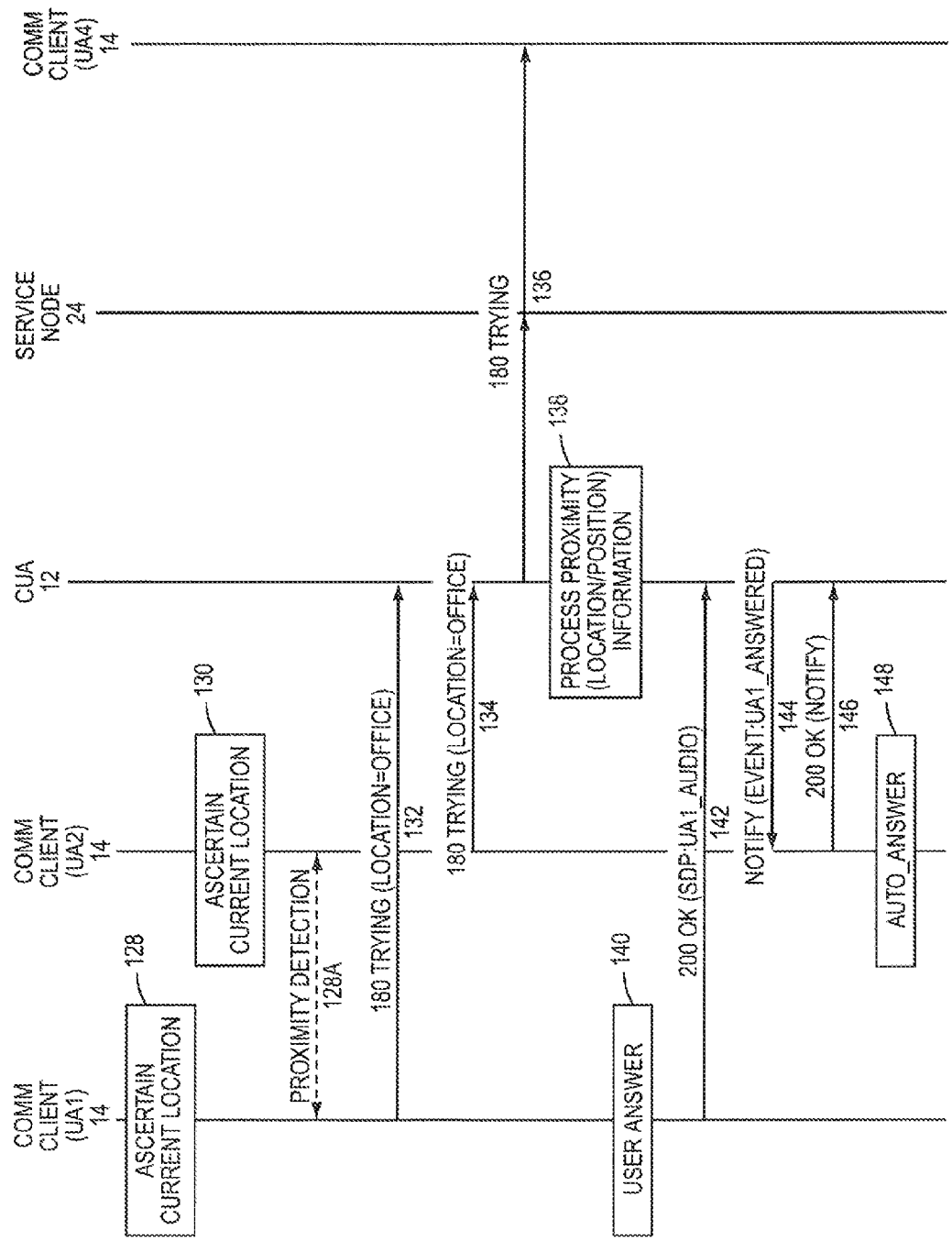
Figure 2C:
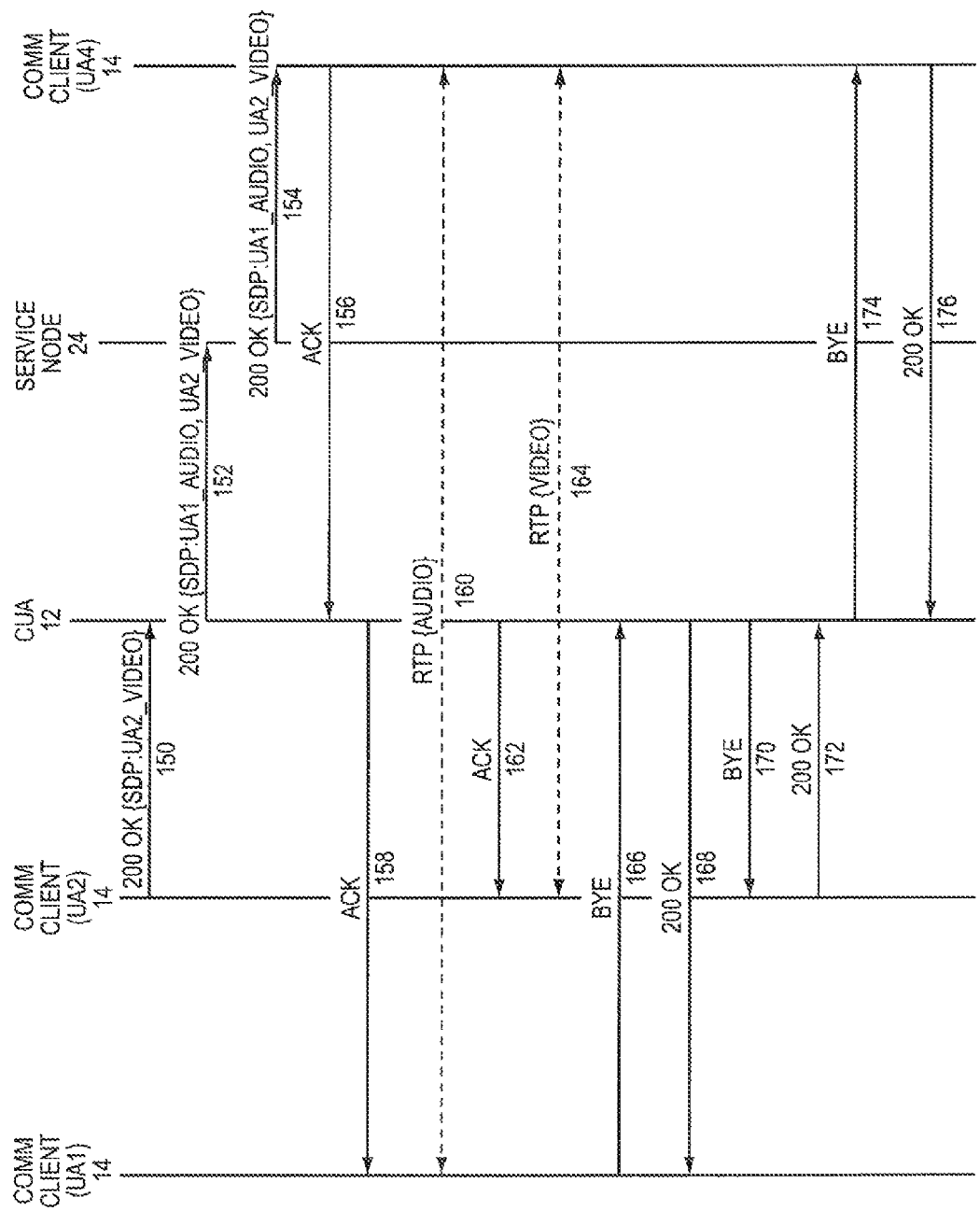
Figure 3A:
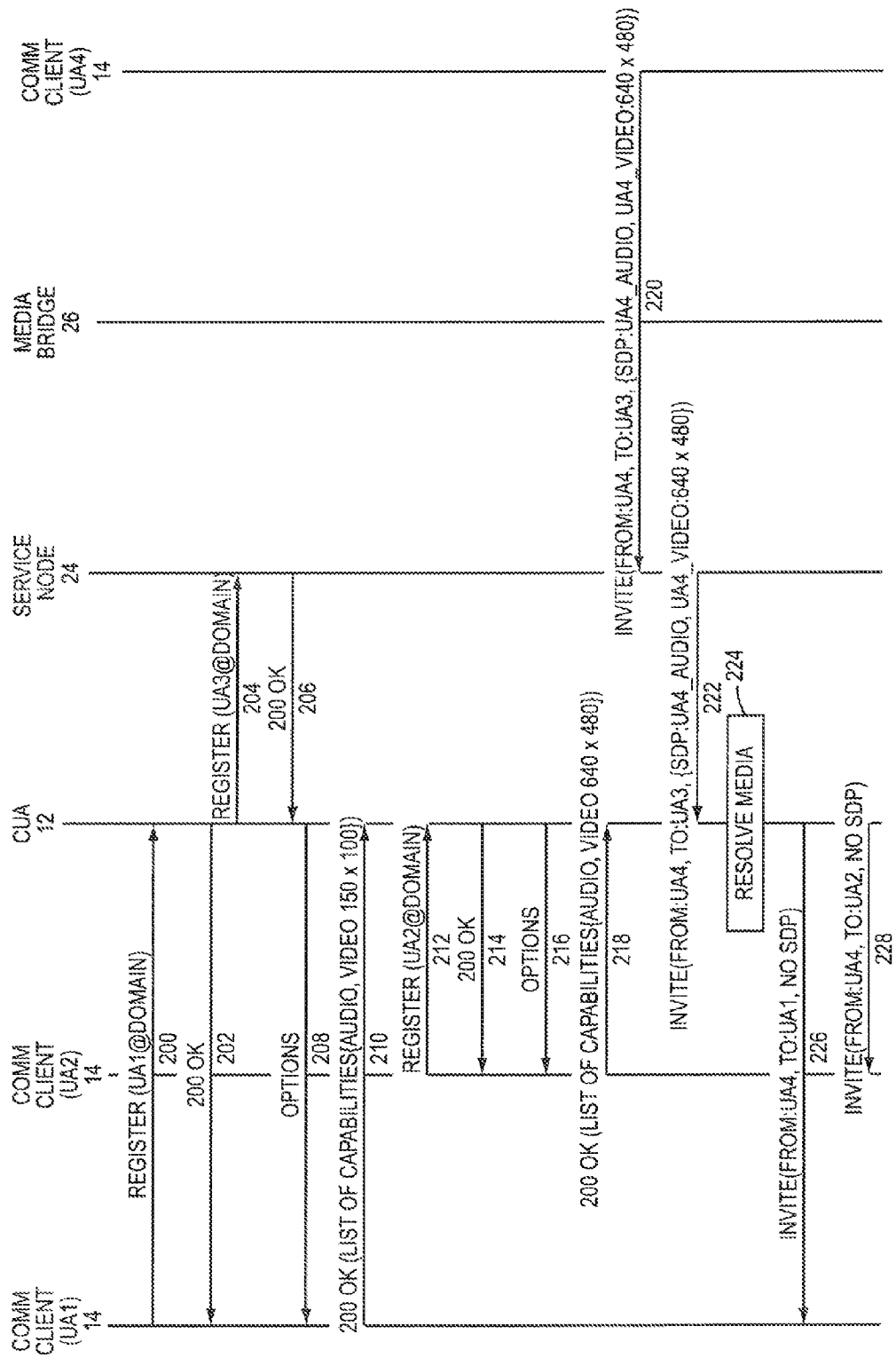
FIGS. 3A-3D show a communication flow diagram according a second exemplary embodiment of the present invention.
Figure 3B:
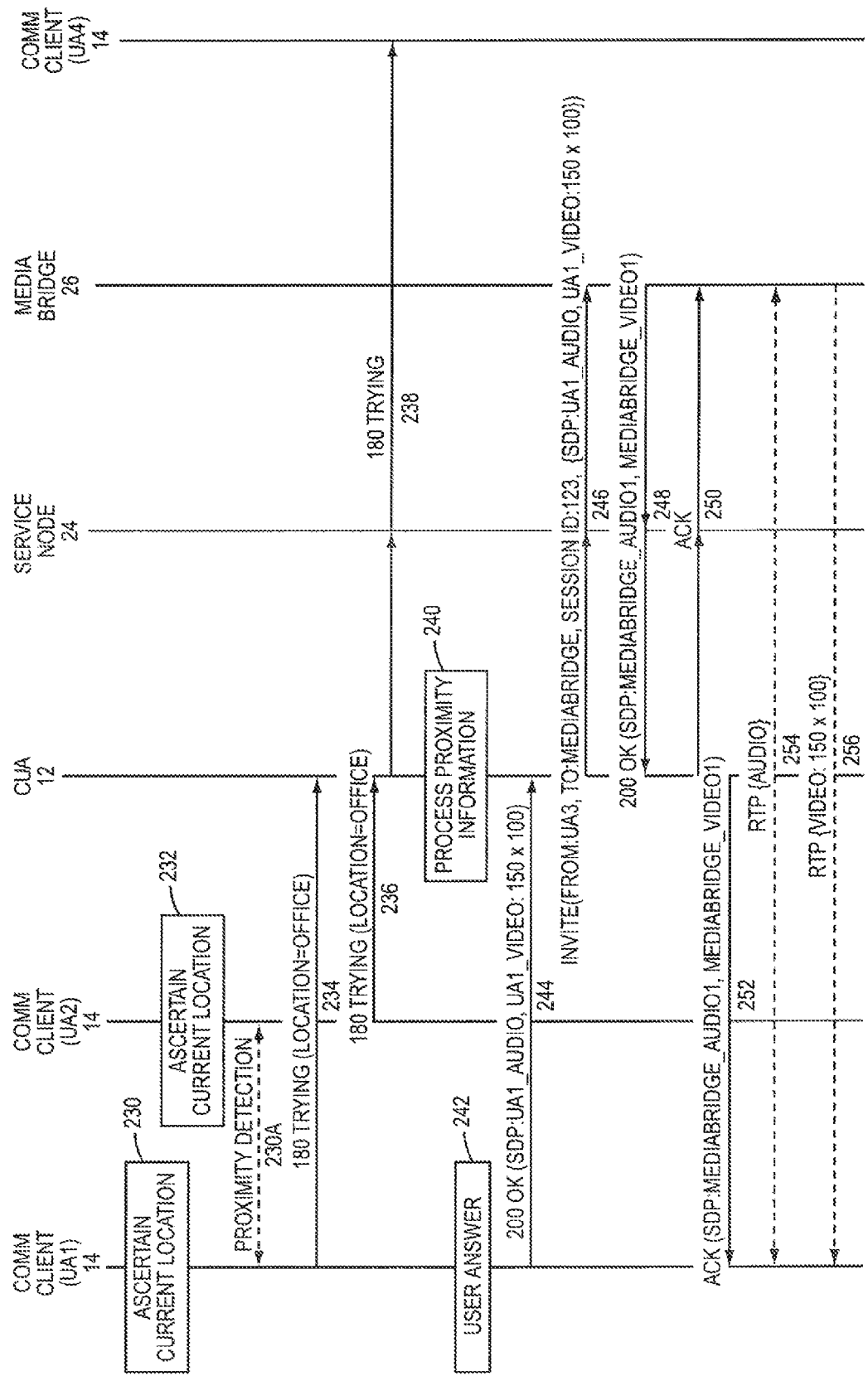
Figure 3C:
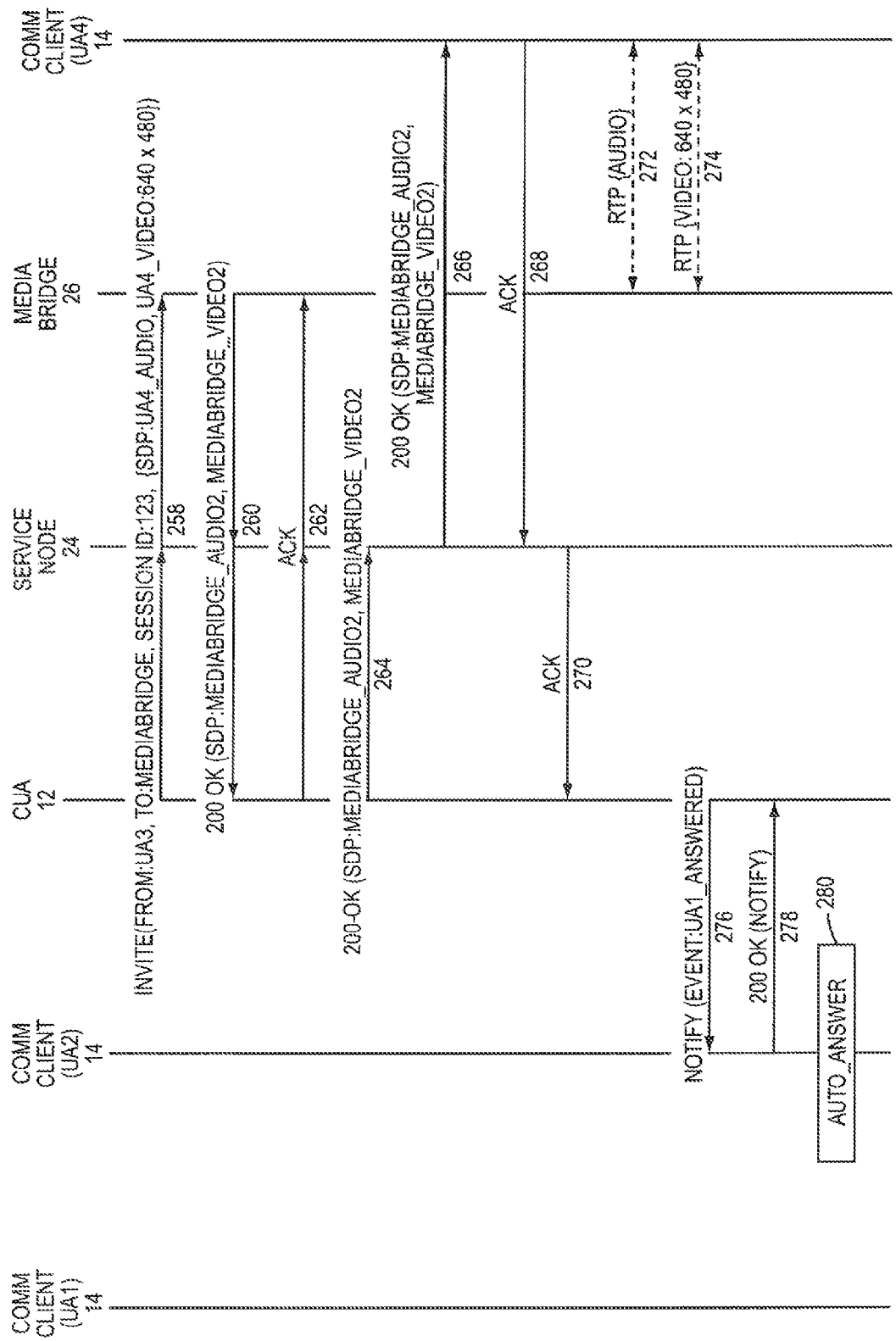
Figure 3D:
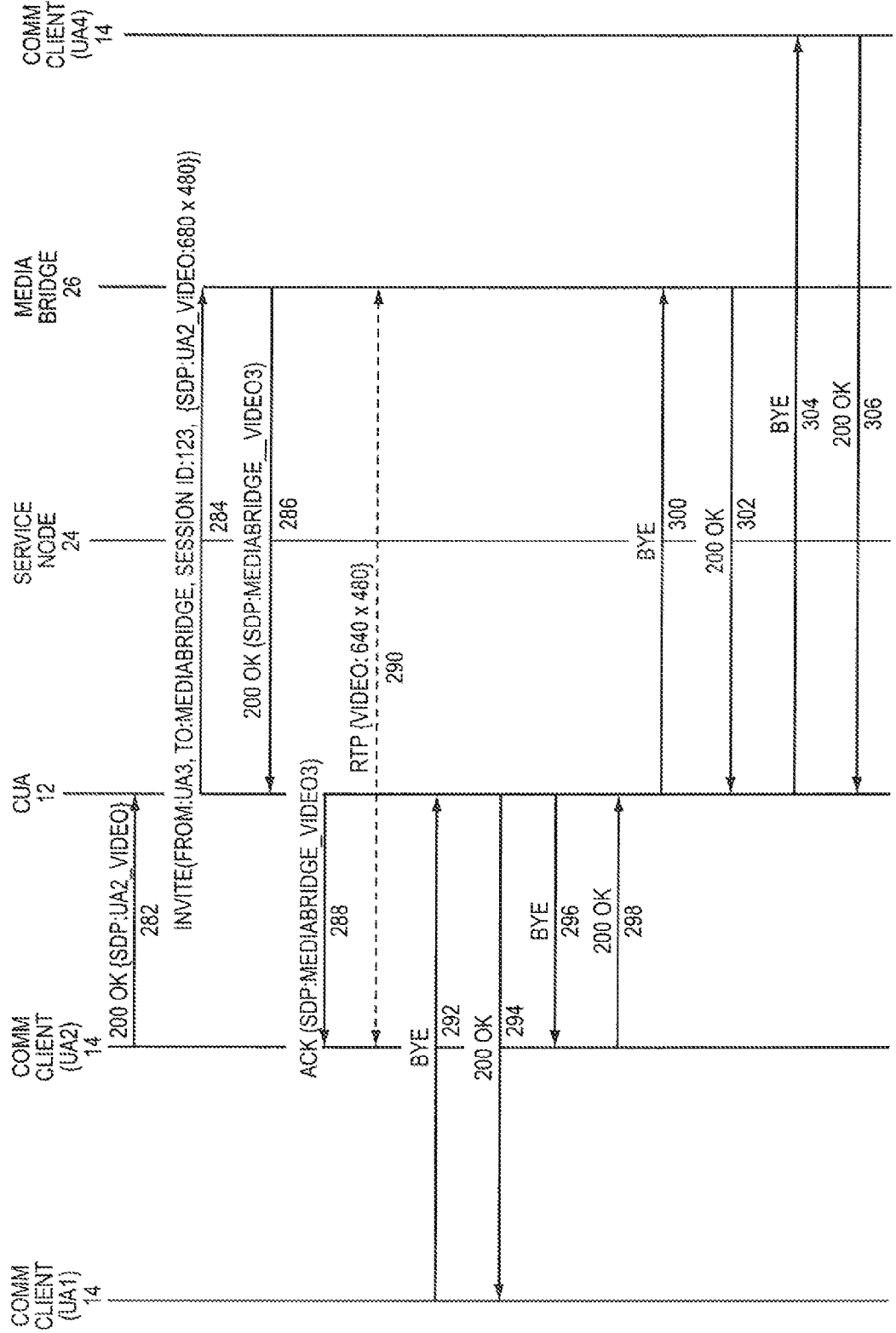

Turning now to FIGS. 2A-2C, an exemplary communication flow is provided wherein an audio session is established between communication client 14 UA1 and communication client 14 UA4, and a video session is established between communication client 14 UA2 and communication client 14 UA4 as part of a single multimedia session with the assistance of the combined user agent 12. Throughout this and the following examples, the Session Initiation Protocol (SIP) is used to set up the respective communication sessions.

Although many communication protocols may be used to facilitate communications, including delivery of state and presence information between the various devices, the Session Initiation Protocol (SIP) or the SIP for Instant Messaging and Presence Leveraging Extensions (SIMPLE) protocol is implemented in one embodiment of the present invention. The specification for SIP is provided in the Internet Engineering Task Force's RFC 3261: Session Initiation Protocol Internet Draft, which is incorporated herein by reference in its entirety.

In general, a SIP proxy, such as may be provided by the service node 24, may facilitate media sessions between any number of endpoints, which represent the devices communicating with each other. These endpoints may support any one or combination of data, audio, and voice media sessions, depending on the configuration of the respective endpoints. In addition to traditional SIP endpoints, endpoints for the present invention may take the form of the communication clients 14 and the like.

A SIP endpoint is generally capable of running an application, which is generally referred to as a user agent (UA), and is capable of facilitating media sessions using SIP. User agents register their ability to establish sessions with a SIP proxy, such as the service node 24, by sending "Register" messages to the SIP proxy. The Register message informs the SIP proxy of the SIP universal resource locator (URL) that identifies the user agent to the SIP network. The Register message also contains information about how to reach specific user agents over the SIP network, by providing the Internet Protocol (IP) address and port that the user agent will use for SIP sessions.

A "Subscribe" message may be used to subscribe to an application or service provided by a SIP endpoint. Further, "Notify" messages may be used to provide information between SIP endpoints in response to various actions or messages, including Register and Subscribe messages.

When a user agent wants to establish a session with another user agent, the user agent initiating the session will send an Invite message to the SIP proxy and specify the targeted user agent in the TO header of the Invite message. Identification of the user agent takes the form of a SIP URL. In its simplest form, the URL is represented by a number or "<username>@<domain>," such as "janedoe@domain.com." The SIP proxy will use the SIP URL in the TO header of the message to determine if the targeted user agent is registered with the SIP proxy. Generally, the user name is unique within the name space of the specified domain.

If the targeted user agent has registered with the SIP proxy, the SIP proxy will forward the Invite message directly to the targeted user agent. The targeted user agent will respond with a 200 OK message, and a session between the respective user agents will be established as per the message exchange required in the SIP specification. Media capabilities are passed between the two user agents of the respective endpoints as parameters embedded within the session setup messages, such as the Invite, 200 OK, and acknowledgement (ACK) messages. The media capabilities are typically described using the Session Description Protocol (SDP). Once respective endpoints are in an active session with each other and have determined each other's capabilities, the specified media content may be exchanged during an appropriate media session.

The exemplary communication flow of FIGS. 2A-2C is described as follows. Initially, each of the communication clients 14 UA1 and UA2 that are supported by the combined user agent 12 will register with the combined user agent 12. Upon registration of the first communication client 14, in this case communication client 14 UA1, the combined user agent 12 will register with the service node 24, which is acting as a SIP proxy. Thus, communication client 14 UA1 will send a Register message identifying its address, UA1@domain, to the combined user agent 12 (step 100), which will respond with a 200 OK message (step 102). When the first communication client 14 UA1 registers with the combined user agent 12, the combined user agent 12 will register with the service node 24 using an address that other communication clients 14 not supported by the combined user agent 12 will use for initiating communications. As such, the combined user agent 12 will send a Register message with an address, UA3@domain, to the service node 24 (step 104), which will respond with a 200 OK message (step 106).

Next, the combined user agent 12 may send an Options request to communication client 14 UA1 (step 108), which will respond by providing a list of its media capabilities, in this case audio, in a 200 OK message (step 110). Communication client 14 UA2 may then send a Register message identifying its address as UA2@domain to the combined user agent 12 (step 112), which will respond with a 200 OK message (step 114). The combined user agent 12 may send an Options Request to communication client 14 UA2 (step 116), which will respond with a list of its capabilities, which include both audio and video, in a 200 OK message back to the combined user agent 12 (step 118). At this point, the combined user agent 12 is registered with the service node 24, which acts as a SIP proxy for communications with the associated communication clients 14 (UA1 and UA2), and the combined user agent 12 is aware of the media capabilities of the respective communication clients 14 (UA1 and UA2). Notably, once one of the communication clients UA1 or UA2 is registered with the combined user agent 12, registration with the service node 24 may occur. Further, registrations of additional communication clients 14 that are supported by the combined user agent 12 need not be registered with the service node 24, since the presence of at least one communication client 14 is associated with the combined user agent 12.

Assume that a user of communication client 14 UA4 wants to initiate a multimedia session including both audio and video sessions with the user associated with communication clients 14 UA1 and UA2. In a SIP environment, the communication client UA4 will send an Invite message from communication client 14 UA4 to the combined user agent 12 using the address for communication client 14 UA3. The Invite message will include Session Data Protocol (SDP) information identifying the audio and video requirements for the multimedia session (UA4_audio and UA4_video). The Invite message will be received by the service node 24 acting as a SIP proxy (step 120) and forwarded to the combined user agent 12 (step 122). Assume that the combined user agent 12 is initially configured to attempt to establish the audio portion of the multimedia session with communication client 14 UA1, and the video portion of the multimedia session with communication client 14 UA2. As such, the combined user agent 12 will send an Invite message to communication client 14 UA1 (step 124). The Invite message will identify itself as being originally from communication client 14 UA4 and specify the Session Data Protocol for the audio as being that compatible with communication client 14 UA4. Similarly, the combined user agent 12 will send an Invite message to communication client 14 UA2 (step 126). The Invite message will indicate that it originated from communication client 14 UA4, and identify Session Data Protocol compatible with the video capabilities of communication client 14 UA4.

In the present example, communication client 14 UA1 is a mobile terminal and communication client 14 UA2 is a personal computer located in the user's office. The combined user agent 12 must determine whether the mobile terminal is sufficiently close to the personal computer to allow the user to simultaneously participate in the audio session via the mobile terminal and the video session via the personal computer. As such, different types of proximity, location, or presence detection schemes may be employed. In one embodiment, communication client 14 UA1 will ascertain its current location (step 128) and communication client 14 UA2 will also ascertain its current location (step 130) and provide the appropriate location information in corresponding 180 Trying messages to the combined user agent 12 (steps 132 and 134). Alternatively, the communication clients 14 (UA1 and UA2) may be able to communicate with each other when they are within a certain proximity, thus allowing for proximity detection (step 128A). When communication client 14 UA1 is proximate to communication client 14 UA2, one or both of the communication clients 14 UA1 and UA2 may send 180 Trying messages indicating that their relative locations are or are not within the user's office (steps 132 and 134). Those skilled in the art will recognize various techniques for determining proximity, location, or any other aspect pertaining to determining a relative position or presence of the associated communication clients 14.

In response to the 180 Trying messages, the combined user agent 12 will send a 180 Trying message to communication client UA4 via the service node 24 (step 136) and process the proximity information, which is defined to include any type of location, presence, proximity, or like information for the associated communication clients 14 (step 138). If the combined user agent 12 determines that the communication clients 14 are sufficiently proximate, such as being within the same office, the combined user agent 12 will allow the respective audio and video sessions to be established. When communication client 14 UA1 is answered (step 140), communication client 14 UA1 may send a 200 OK message identifying an appropriate Session Data Protocol parameter for the audio session (UA1_audio) to the combined user agent 12 (step 142), which will respond by sending a Notify message indicating that communication client 14 UA1 has been answered to communication client 14 UA2 (step 144). Communication client 14 UA2 will respond with a 200 OK message to acknowledge the Notify message (step 146). Communication client 14 UA2 may be configured to automatically answer in response to receiving a Notify message (step 148), and thus send a 200 OK message identifying the Session Data Protocol parameters for the video session (UA2_video) to the combined user agent 12 (step 150). At this point, the combined user agent 12 has the Session Data Protocol parameters for the audio and video sessions for the respective communications clients 14 UA1 and UA2. These parameters may include the addresses and port numbers of the respective communication clients 14 UA1 and UA2 to use for establishing the audio and video sessions.

At this point, the combined user agent 12 will respond to the original Invite message initiated from communication client 14 UA4 by sending a 200 OK message identifying the Session Data Protocol parameters for the audio and video sessions (step 152). The 200 OK message may be sent to the service node 24 for delivery to communication client 14 UA4 (step 154). The Session Data Protocol parameters for the audio and video sessions will identify an address, port number, and CODEC (coding/decoding technique) for the audio session to be established with communication client 14 UA1 and the address, port number, and codec for the video session to be established with communication client 14 UA2. An acknowledgement may be sent back to the combined user agent 12 directly or through the service node 24 (step 156). The combined user agent 12 will send the acknowledgement back to communication client 14 UA1 (step 158), wherein a Real Time Protocol (RTP) audio session may be established between communication client 14 UA4 and communication client 14 UA1 (step 160). As such, communication client 14 UA4 will send packets to communication client 14 UA1 using the Session Data Protocol parameters for communication client 14 UA1, and vice versa. The combined user agent 12 will also send an acknowledgement to communication client 14 UA2 for the video session (step 162). Upon receipt, an RTP video session is established between communication client 14 UA4 and communication client 14 UA2 (step 164). Again, the respective Session Data Protocol parameters for the respective communication clients 14 UA2 and UA4 are used to allow bi-directional video to be sent directly between the respective communication clients 14 UA2 and UA4.

To end the session, one of the communication clients 14 UA1 will send a Bye message to the combined user agent 12 (step 166), which will respond with a 200 OK message back to the sending communication client 14 UA1 (step 168) as well as send a Bye message to the other associated communication client 14 UA2 (step 170). Communication client 14 UA2 will respond with a 200 OK message (step 172), triggering the combined user agent 12 to send a Bye message to communication client 14 UA4 (step 174), which will respond with a 200 OK message back to the combined user agent 12 (step 176). At this point, the respective audio and video communication sessions will be ended.

Turning now to FIGS. 3A-3D, another exemplary communication flow is provided wherein video is provided in a different format to both communication clients 14 UA1 and UA2 by employing the media bridge 26. Initially, communication client 14 UA1 will register with the combined user agent 12 using the address UA1@domain (step 200). The combined user agent 12 will respond by sending a 200 OK message to communication client 14 UA1 (step 202), as well as by sending a Register message to the service node 24 to register address UA3@domain for the combined user agent 12 (step 204). The service node 24, which is again acting as a SIP proxy, will respond with a 200 OK message back to the combined user agent 12 (step 206). The address UA3@domain is the address with which communications are initiated for any of the associated communication clients 14 (UA1 and UA2) being supported by the combined user agent 12. The combined user agent 12 will send an Options request to communication client 14 UA1 (step 208), which will respond with a 200 OK message including the list of multimedia capabilities (step 210). In this instance, communication client 14 UA1 is capable of supporting audio as well as video at a resolution of 150×100. Communication client 14 UA2 will then register with the combined user agent 12 by sending a Register message identifying its address as UA2@domain (step 212). The combined user agent 12 will respond by sending a 200 OK message (step 214), as well as an Options request (step 216), to communication client 14 UA2. In response, communication client 14 UA2 will send a 200 OK message providing a list of its multimedia capabilities, which include audio and video at a resolution of 640×480 (step 218). At this point, the combined user agent 12 recognizes the respective multimedia capabilities of the communication clients 14 UA1 and UA2.

Next, assume that communication client 14 UA4 sends an Invite message to UA3@domain to initiate a multimedia session to include both audio and video (step 220). The Invite message will be received by the service node 24, which is acting as a SIP proxy, and will include in the Session Data Protocol the audio and video parameters for communication client 14 UA4. In this example, the video parameters for communication client 14 UA4 include a resolution of 640×480. The service node 24 will forward the Invite message to the combined user agent 12 (step 222), which will take the necessary steps to resolve the media parameters and requirements (step 224). In particular, the combined user agent 12 will recognize that the Invite message from communication client 14 UA4 requests both an audio and video session, and that both communication clients 14 UA1 and UA2 can support audio and video, yet at different resolutions. Further assume that the combined user agent 12 is configured to attempt to establish video sessions with both the communication clients 14 UA1 and UA2 simultaneously with the assistance of the media bridge 26, and if the communication clients 14 UA1 and UA2 are within the same office, only establish an audio session with communication client 14 UA1. As such, Invite messages may be sent to the respective communication clients 14 UA1 and UA2 indicating that sessions are being requested by communication client 14 UA4 (steps 226 and 228).

In this example, no Session Data Protocol parameters are provided to the communication clients 14 UA1 and UA2 at this point, because the media bridge 26 will play a role in establishing the various audio and video sessions. However, the Invite messages may trigger the communication clients 14 UA1 and UA2 to ascertain their current locations (steps 230 and 232), or communicate with one another to determine their relative proximity (step 230A). Regardless of the mechanism for location or proximity determinations, the communication clients 14 UA1 and UA2 will send 180 Trying messages to the combined user agent 12 indicating their relative locations (steps 234 and 236). The combined user agent 12 will in turn send a 180 Trying message to communication client UA4 14 via the service node 24 (step 238). In this example, both of the communications clients 14 UA1 and UA2 are located in the user's office. The combined user agent 12 will process the proximity information (step 240) and determine that an audio session should be established with communication client 14 UA1, and that video sessions should be established with both communication client 14 UA2 and communication client 14 UA1 using the different resolutions of the respective devices.

When the user answers communication client 14 UA1 (step 242), a 200 OK message is sent back to the combined user agent 12 (step 244). The 200 OK message will identify the Session Data Protocol parameters for both audio and video. These parameters may include the address and port numbers at which packets will be received at communication client 14 UA1 for audio and video, as well as the resolution for the video to be sent to communication client 14 UA1. Upon receipt of the 200 OK message, the combined user agent 12 will send an Invite message intended for the media bridge 26 (step 246). The Invite message may be sent through the service node 24. The Invite message will provide a Session ID (123), as well as specify the Session Data Protocol parameters for the multimedia session, including those for the audio session, the video session, and the resolution for the video session (150×100) for communication client 14 UA1. The media bridge 26 will respond by providing its Session Data Protocol parameters for the audio and video sessions to the combined user agent 12, perhaps in a 200 OK message (step 248). Again, the 200 OK message may be sent through the service node 24. The combined user agent 12 may send an acknowledgement back to the media bridge 26, directly or indirectly through the service node 26 (step 250). The combined user agent 12 will also send an acknowledgement back to communication client 14 UA1 identifying the Session Data Protocol parameters for the media bridge 26 for both the audio and video sessions (step 252).

At this point, an RTP audio session is established between communication client 14 UA1 and the media bridge 26 (step 254). Further, an RTP video session using the resolution of 150×100 is established between communication client 14 UA1 and the media bridge 26 (step 256). Since communication client 14 UA1 does not have the capability to send video, the video session is unidirectional from the media bridge 26 to communication client 14 UA1. Next, the audio and video sessions must be established between the media bridge 26 and communication client 14 UA4 to complete the audio and video connections between communication client 14 UA1 and communication client 14 UA4. As such, the combined user agent 12 will send an Invite message toward the media bridge 26 (step 258). The Invite message will include the Session Data Protocol parameters for communication client 14 UA4 for both the audio and video sessions. In this case, the video may be sent at a resolution of 640×480, wherein the media bridge 26 will take the necessary steps to convert the 640×480 video to a 150×100 resolution for delivery to communication client 14 UA1, and simply pass the 640×480 video to communication client 14 UA2, since communication client 14 UA2 can handle the 640×480 resolution. In response to the Invite message, the media bridge 26 will send a 200 OK message identifying the Session Data Protocol parameters for the audio and video sessions (step 260). The combined user agent 12 will send an acknowledgement back to the media bridge 26 (step 262), as well as send a 200 OK message toward communication client 14 UA4 identifying the Session Data Protocol parameters for the media bridge 26 for both the audio and video sessions (steps 264 and 266). Communication client 14 UA4 will respond with an acknowledgement (steps 268 and 270), wherein an RTP audio session may be established between the media bridge 26 and the communication client UA4 (step 272). Further, an RTP video session using a 640×480 resolution may be established between the media bridge 26 and communication client 14 UA4 (step 274). The media bridge 26 will effectively bridge the RTP audio and video sessions with communication client 14 UA1 and communication client 14 UA4. At this point, a bi-directional audio session and a unidirectional and video session are established between communication client 14 UA1 and communication client 14 UA4 via the media bridge 26. Notably, a bi-directional video session is established between the media bridge 26 and communication client 14 UA4, and only a unidirectional video session established from the media bridge 26 to communication client 14 UA1. The media bridge 26 will downconvert the 640×480 video to 150×100 for delivery to communication client 14 UA1.

Next, the 640×480 bi-directional video session must be established between the media bridge 26 and communication client 14 UA2. The combined user agent 12 will automatically send a Notify message to communication client 14 UA2 to indicate that communication client 14 UA1 was answered (step 276). Communication client 14 UA2 may respond with a 200 OK message (step 278) and trigger an automatic answer message for communication client 14 UA2 (step 280). Alternatively, an alerting or ringing signal may be provided to alert the user that a session should be answered at communication client 14 UA2. In either event, upon answering, communication client 14 UA2 will send a 200 OK message identifying the Session Data Protocol parameters for video (step 282). These parameters may include the address and port number at which video packets will be received. The combined user agent 12 will send an Invite message to the media bridge 26 to initiate the video session (step 284). Importantly, the Invite message may include the Session ID 123 indicating that the requested session is associated with the previously established session. The Invite message may also include the Session Data Protocol parameters for communication client 14 UA2. In this case, the video resolution supported by communication client 14 UA2 is 640×480. The media bridge 26 will respond by providing its Session Data Protocol parameters in a 200 OK message to the combined user agent 12 (step 286). The media bridge's SDP parameters are forwarded to communication client 14 UA2 in an Acknowledgement message (step 288). At this point, the media bridge 26 and communication client 14 UA2 know each other's SDP parameters and may send video packets to one another using a 640×480 resolution in an RTP video session (step 290).

At this point, the media bridge 26 can effectively receive video packets in a 640×480 resolution from communication client 14 UA4, can deliver 640×480 resolution packets to communication client 14 UA2, and can deliver 150×100 resolution packets to communication client 14 UA1. Further, video packets received from communication client 14 UA2 can be forwarded to communication client 14 UA4 through the media bridge 26. The media bridge will support a bi-directional audio session between communication client 14 UA1 and communication client 14 UA4. Thus, the media bridge 26 may effectively distribute various types of media among the different communication clients 14 as desired.

When the session ends, communication client 14 UA1 may send a Bye message to the combined user agent 12 (step 292), which will respond by sending a 200 OK message back to communication client 14 UA1 (step 294) as well as sending a Bye message to communication client 14 UA2 (step 296). Communication client 14 UA2 will respond by sending a 200 OK message back to the combined user agent (step 298), which will send a Bye message to the media bridge 26 (step 300). The media bridge 26 will send a 200 OK message back to the combined user agent 12 (step 302), which will then send a Bye message to communication client 14 UA4 (step 304), which will respond with a 200 OK message sent back to the combined user agent 12 (step 306). As such, the combined user agent 12 will effectively end the sessions by communicating with each of the participating devices, including communication clients 14 UA1, UA2, and UA4, along with the media bridge 26.

When a media bridge 26 is not in play, the combined user agent 12 may also provide different adaptations of protocol for the respective communication clients 14 being supported, as well as for those remote communication clients 14 with which communications are established. The combined user agent 12 may also perform adaptation of the various media sessions. For example, the combined user agent 12 may convert video resolutions or audio codecs to match the communicating communication clients 14, just as can be afforded in the media bridge 26.

The communication clients 14 may log incoming and outgoing sessions. Similar call logging may also be provided at the combined user agent 12. Notably, the combined user agent 12 may be configured to take different actions or establish sessions with different communication clients 14 that are being supported based on various criteria, including proximity information, which will include location or presence information as well as time, date, calling or called parties, or other desired criteria. Further, communication clients 14 may join a session that is already established once the proximity rules are met. For example, an existing communication session between communication client 14 UA2 and communication client 14 UA4 may be joined by communication client 14 UA1 once communication client 14 UA1 comes within a certain proximity of communication client 14 UA2. The proximity or relative location detection may be based on Global Positioning System (GPS) coordinates, the use of Radio Frequency (RF) communications, or any other applicable technique for determining the relative proximity of the devices to one another. Further, the user of the devices may provide input indicating the devices are proximate to one another or that communications should be established using multiple ones of the communication clients 14 that are supported by the combined user agent 12. As devices come within an acceptable proximity of one another, the existing communication sessions may be modified, dropped, or otherwise altered as desired.

Figure 4:
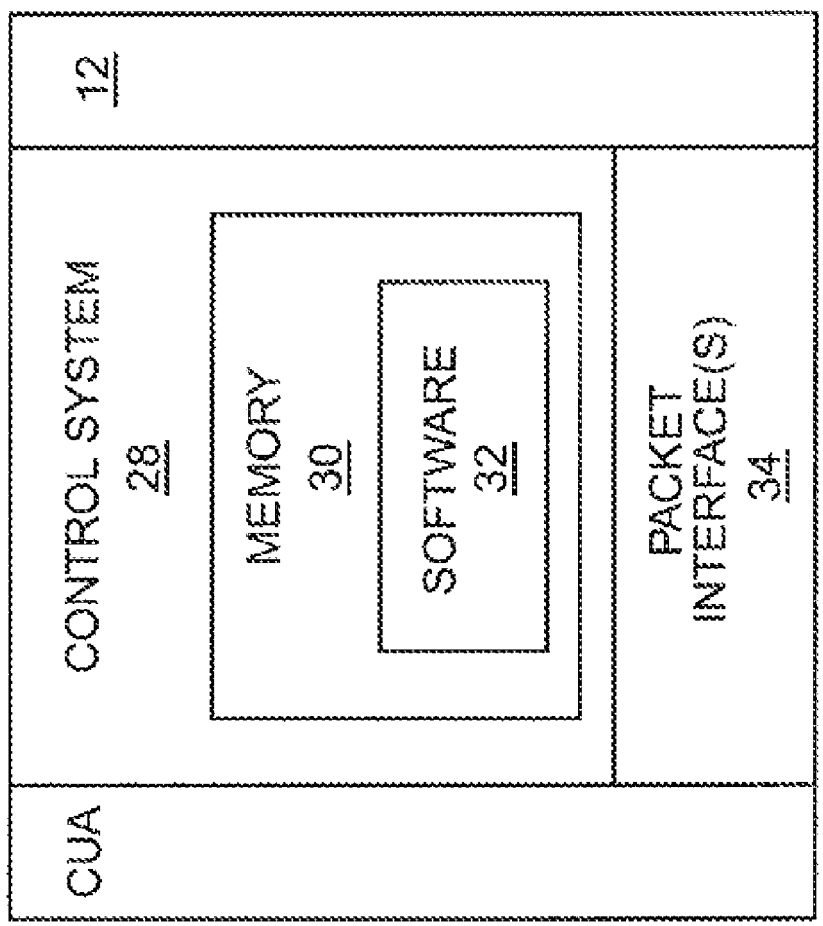
FIG. 4 is a block representation of a combined user agent according to one embodiment of the present invention.

Turning now to FIG. 4, a block representation of a combined user agent 12 is provided. In general, the combined user agent 12 will include a control system 28 having memory 30 sufficient for the software 32 necessary to afford the functionality described above. The control system 28 will include one or more packet interfaces 34 to facilitate communications with various communication clients 14, the service node 24, the media bridge 26, or other devices necessary for communications.

Those skilled in the art will recognize improvements and modifications to the preferred embodiments of the present invention. All such improvements and modifications are considered within the scope of the concepts disclosed herein and the claims that follow.

What is claimed is:

1. A method of operation of a combined user agent to facilitate a media communication session between a plurality of communication clients and at least one remote communication client, the method comprising:
   registering a plurality of communication clients with the combined user agent;
   determining a relative proximity between at least two of the registered plurality of communication clients;
   receiving a request to establish a communication session with the at least one remote communication client;
   selecting at least two of the registered plurality of communication clients based on the determined relative proximity between the at least two of the plurality of registered communication clients; and
   facilitating signaling with the at least one remote communication client and the selected at least two of the plurality of registered communication clients to establish a plurality of media sessions, which are at least part of the requested communication session, between the at least one remote communication client and the selected at least two of the plurality of registered communication clients, wherein the combined user agent presents a single communication address to the at least one remote communication client on behalf of the selected at least two of the plurality of registered communication clients, such that initial communication between the at least one remote communication client and one of the at least two of the plurality of registered communication clients occurs via the combined user agent.

2. The method of claim 1, wherein the plurality of communication clients are associated with one user and the at least one remote communication client is associated with another user.

3. The method of claim 1, further comprising determining a location of at least one of the plurality of registered communication clients, wherein determining a relative proximity between at least two of the registered plurality of communication clients is based, at least in part, on the determined location of at least one of the plurality of registered communication clients.

4. The method of claim 1, wherein facilitating signaling with the remote communication client and the selected at least two of the plurality of registered communication clients to establish a plurality of media sessions comprises receiving incoming signaling messages from the at least one remote communication client and sending signaling messages to the at least two of the plurality of registered communication clients based on different ones of the plurality of media sessions being handled by the at least two of the plurality of registered communication clients.

5. The method of claim 1, wherein facilitating signaling with the at least one remote communication client and the selected at least two of the plurality of registered communication clients to establish a plurality of media sessions comprises receiving signaling messages from the at least two of the plurality of registered communication clients and sending the signaling messages to the at least one remote communication client.

6. The method of claim 1, wherein the plurality of registered communication clients have different media capabilities.

7. The method of claim 1, further comprising obtaining media capabilities of the plurality of registered communication clients.

8. The method of claim 1, wherein different ones of the plurality of media sessions are established with different ones of the plurality of registered communication clients based on media capabilities of the at least two of the plurality of registered communication clients.

9. The method of claim 1, wherein different ones of the plurality of media sessions are established with the different ones of the at least two of the registered communication clients based on preferences of a user associated with the plurality of registered communication clients.

10. The method of claim 1, wherein one of the at least two of the plurality of registered communication clients can initiate a multimedia session by establishing one of the plurality of media sessions.

11. The method of claim 1, wherein the media sessions are established directly between the remote communication client and the at least two of the plurality of registered communication clients.

12. The method of claim 1, further comprising replicating at least one of the media sessions with the at least two of the plurality of registered communication clients.

13. The method of claim 12, wherein replicating at least one of the media sessions comprises interacting with a media bridge to replicate at least one of the media sessions with the at least two of the plurality of registered communication clients.

14. The method of claim 13, wherein interacting with a media bridge to replicate at least one of the media sessions with the at least two of the plurality of registered communication clients comprises replicating the at least one of the media sessions with different parameters.

15. The method of claim 14, wherein the at least one of the media sessions with the at least two of the plurality of registered communication clients is provided based on capabilities of the at least two of the plurality of registered communication clients.

16. The method of claim 1, further comprising facilitating establishment of a media session between the at least one remote communication client and the another of the plurality of the registered communication clients.

17. The method of claim 1 further comprising allowing another of the plurality of registered communication clients to control one of the media sessions between the at least one remote communication client and the at least two of the registered communication clients.

18. The method of claim 1, wherein a Session Initiation Protocol (SIP) is used to facilitate signaling.

19. The method of claim 1, wherein the combined user agent appears as the single communication client having media capabilities of two or more of the registered communication clients.

20. The method of claim 19, wherein the combined user agent is associated with a common identification for addressing the plurality of registered communication clients.

21. A method of facilitating a media communication session between a plurality of communication clients and at least one remote communication client, the method comprising:
  presenting a combined user agent for a plurality of supported communication clients to a remote communication client, the plurality of supported communication clients being packet-based communication clients;
  determining a relative proximity between at least two of the plurality of supported communication clients;
  facilitating signaling with the remote communication client and the at least two of the plurality of supported communication clients to establish a plurality of media sessions, which are part of a media session between the remote communication client and the at least two of the plurality of supported communication clients, wherein the combined user agent presents a single communication address to the remote communication client on behalf of the plurality of supported communication clients, such that initial communication between the remote communication client and one of the at least two of the plurality of supported communication clients occurs via the combined user agent using the single communication address; and
  establishing the plurality of media sessions with the different ones of the at least two of the plurality of supported communication clients based on the relative proximity between the at least two of the plurality of supported communication clients.

22. The method of claim 21, wherein the plurality of communication clients are associated with one user and the one remote communication client is associated with another user.

23. The method of claim 21, further comprising determining a location of at least one of the plurality of registered communication clients, wherein determining a relative proximity between at least two of the registered plurality of communication clients is based, at least in part, on the determined location of at least one of the plurality of registered communication clients.

24. The method of claim 21, wherein facilitating signaling with the remote communication client and the at least two of the plurality of supported communication clients to establish a plurality of media sessions comprises receiving incoming signaling messages from the remote communication client and sending signaling messages to the at least two of the plurality of supported communication clients based on different ones of the plurality of media sessions being handled by the at least two of the plurality of supported communication clients.

25. The method of claim 21, wherein facilitating signaling with the remote communication client and the at least two of the plurality of supported communication clients to establish a plurality of media sessions comprises receiving signaling messages from the at least two of the plurality of supported communication clients and sending the signaling messages to the remote communication client.

26. The method of claim 21, wherein the plurality of supported communication clients have different media capabilities.

27. The method of claim 21, further comprising obtaining media capabilities of the plurality of supported communication clients.

28. The method of claim 21, wherein different ones of the plurality of media sessions are established with different ones of the plurality of supported communication clients based on media capabilities of the at least two of the plurality of supported communication clients.

29. The method of claim 21, wherein different ones of the plurality of media sessions are established with the different ones of the at least two of the supported communication clients based on preferences of a user associated with the plurality of supported communication clients.

30. The method of claim 21, wherein one of the at least two of the plurality of supported communication clients can initiate a multimedia session by establishing one of the plurality of media sessions.

31. The method of claim 21, wherein the media sessions are established directly between the remote communication client and the at least two of the plurality of supported communication clients.

32. The method of claim 21, further comprising replicating at least one of the media sessions with the at least two of the plurality of registered communication clients.

33. The method of claim 32, wherein replicating at least one of the media sessions comprises interacting with a media bridge to replicate at least one of the media sessions with the at least two of the plurality of registered communication clients.

34. The method of claim 33, wherein interacting with a media bridge to replicate at least one of the media sessions with the at least two of the plurality of registered communication clients comprises replicating the at least one of the media sessions with different parameters.

35. The method of claim 34, wherein the at least one of the media sessions with the at least two of the plurality of registered communication clients is provided based on capabilities of the at least two of the plurality of registered communication clients.

36. The method of claim 21, further comprising facilitating establishment of a media session between the remote communication client and the another of the plurality of the registered communication clients.

37. The method of claim 21, further comprising allowing another of the plurality of registered communication clients to control one of the media sessions between the remote communication client and the at least two of the registered communication clients.

38. The method of claim 21, wherein a Session Initiation Protocol (SIP) is used to facilitate signaling.

39. The method of claim 21, wherein the combined user agent appears as the single communication client having media capabilities of two or more of the registered communication clients.

40. The method of claim 39, wherein the combined user agent is associated with a common identification for addressing the plurality of registered communication clients.

* * * * *